(12) United States Patent
Rozman et al.

(10) Patent No.: US 8,890,463 B2
(45) Date of Patent: Nov. 18, 2014

(54) DIRECT CURRENT BUS MANAGEMENT CONTROLLER

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 477 days.

(21) Appl. No.: 13/218,184

(22) Filed: Aug. 25, 2011

(65) Prior Publication Data

US 2013/0049648 A1 Feb. 28, 2013

(51) Int. Cl.
*H02P 27/04* (2006.01)
*B60L 7/22* (2006.01)
*B60L 11/12* (2006.01)
*B60R 16/03* (2006.01)
*H02J 1/10* (2006.01)

(52) U.S. Cl.
CPC . *B60R 16/03* (2013.01); *B60L 7/22* (2013.01); *B60L 11/12* (2013.01); *Y02T 10/70* (2013.01); *Y02T 10/7077* (2013.01); *H02J 1/10* (2013.01)
USPC ............. 318/800; 318/139; 318/801; 363/34; 363/40; 363/84; 363/125

(58) Field of Classification Search
CPC ......... H02M 3/00; H02M 1/00; H02M 11/00; H02M 2003/00; H02M 1/12; H02P 1/00; H02P 2201/13; H02P 27/08; H02P 27/06; H02J 3/01
USPC ......... 318/700, 701, 721, 727, 799, 800, 801; 318/432, 139; 180/65.2; 363/34, 40, 51, 84, 363/125
See application file for complete search history.

(56) References Cited

U.S. PATENT DOCUMENTS

| 4,093,900 A | 6/1978 | Plunkett |
| 4,119,861 A | 10/1978 | Gocho |
| 4,420,784 A | 12/1983 | Chen et al. |
| 4,638,175 A | 1/1987 | Bradford et al. |
| 5,132,894 A | 7/1992 | Rozman et al. |
| 5,291,143 A | 3/1994 | Cronauer |

(Continued)

FOREIGN PATENT DOCUMENTS

| DE | 19607669 A1 | 9/1997 |
| EP | 1921531 A1 | 5/2008 |
| EP | 2179882 | 4/2010 |

OTHER PUBLICATIONS

Extended European Search Report for EP application No. 12181283.8 mailing date May 10, 2013.

(Continued)

*Primary Examiner* — Antony M Paul
(74) *Attorney, Agent, or Firm* — Cantor Colburn LLP

(57) ABSTRACT

A direct current bus management system can include a power management and distribution unit, having a source management section, a bus management section coupled to the source management section, a load management section coupled to the bus management section, a DC bus coupled to the power management and distribution unit, a plurality of DC sources coupled to the source management section and a plurality of loads coupled to the load management section, wherein the bus management section is configured to reconfigure excess DC power on the DC bus from the DC inputs from the plurality of DC sources based on a plurality of priorities, a plurality of feedback signals and a plurality of system parameters.

20 Claims, 4 Drawing Sheets

(56) References Cited

U.S. PATENT DOCUMENTS

| | | |
|---|---|---|
| 5,350,997 A | 9/1994 | Ghotbi et al. |
| 5,422,517 A | 6/1995 | Verney et al. |
| 5,455,731 A | 10/1995 | Parkinson |
| 5,466,998 A | 11/1995 | Kinoshita et al. |
| 5,495,155 A | 2/1996 | Juzswik et al. |
| 5,526,347 A | 6/1996 | Chen et al. |
| 5,710,699 A | 1/1998 | King et al. |
| 5,752,047 A | 5/1998 | Darty et al. |
| 6,072,673 A | 6/2000 | Chen et al. |
| 6,154,379 A | 11/2000 | Okita |
| 6,577,138 B2 | 6/2003 | Zuercher et al. |
| 6,608,396 B2 * | 8/2003 | Downer et al. ............. 290/40 C |
| 6,643,112 B1 | 11/2003 | Carton et al. |
| 7,315,774 B2 | 1/2008 | Morris |
| 7,408,319 B2 * | 8/2008 | Lloyd et al. ................. 318/729 |
| 7,453,680 B2 | 11/2008 | Hallak et al. |
| 7,564,147 B2 | 7/2009 | Michalko |
| 7,595,613 B2 | 9/2009 | Thompson et al. |
| 7,715,958 B2 * | 5/2010 | Kumar ............................ 701/22 |
| 7,732,939 B2 | 6/2010 | Fuller et al. |
| 7,741,883 B2 | 6/2010 | Fuller et al. |
| 7,830,071 B2 | 11/2010 | Abramovich et al. |
| 7,847,429 B2 | 12/2010 | Miyama et al. |
| 7,952,225 B2 | 5/2011 | Reichard et al. |
| 8,080,973 B2 | 12/2011 | King et al. |
| 8,295,950 B1 * | 10/2012 | Wordsworth et al. ........... 700/22 |
| 8,536,730 B2 | 9/2013 | Rozman et al. |
| 8,553,373 B2 | 10/2013 | Rozman et al. |
| 2002/0157881 A1 * | 10/2002 | Bakholdin et al. ........... 180/65.2 |
| 2003/0102845 A1 | 6/2003 | Aker et al. |
| 2004/0156154 A1 | 8/2004 | Lazarovich et al. |
| 2007/0029986 A1 | 2/2007 | Nakamura et al. |
| 2008/0106152 A1 | 5/2008 | Maier |
| 2008/0143462 A1 | 6/2008 | Belisle et al. |
| 2009/0295341 A1 | 12/2009 | Nakamura et al. |
| 2009/0314179 A1 | 12/2009 | Kumar |
| 2010/0254046 A1 | 10/2010 | Liu et al. |
| 2013/0049465 A1 | 2/2013 | Rozman et al. |

OTHER PUBLICATIONS

European Search Report dated May 10, 2013 for Application No. 12181417.2-1503.

European International Search Report dated Dec. 20, 2012 for Application No. 12181229.1-1233.

* cited by examiner

DIRECT CURRENT BUS MANAGEMENT CONTROLLER

BACKGROUND OF THE INVENTION

The subject matter disclosed herein relates to electric power generation and distribution, and more particularly to a direct current (DC) bus management controller and method for controlling a DC bus.

Electrical power systems in hybrid vehicles, such as military hybrid vehicles, can include high voltage direct current (DC) power generation and distribution in systems having multiple loads and power sources. Some of the loads are regenerative loads, such as electrically driven actuators. Regenerative power from these loads may be returned to the distribution (system) bus. Conventional methods utilize shunt regulators to direct the regenerative power into power dissipation resistors. These methods require additional thermal management to reject generated heat losses, and typically do not allow for the capture and re-use of regenerative energy.

BRIEF DESCRIPTION OF THE INVENTION

Exemplary embodiments include a direct current bus management system, including a power management and distribution unit, having a source management section, a bus management section coupled to the source management section, a load management section coupled to the bus management section, a DC bus coupled to the power management and distribution unit, a plurality of DC sources coupled to the source management section and a plurality of loads coupled to the load management section, wherein the bus management section is configured to reconfigure excess DC power on the DC bus from the DC inputs from the plurality of DC sources based on a plurality of priorities, a plurality of feedback signals and a plurality of system parameters.

Additional exemplary embodiments can include a power management and distribution apparatus, including a source management section, a bus management section coupled to the source management section, a load management section coupled to the bus management section, and a DC bus coupled to the source management section, the bus management section, and the load management section, wherein the bus management section is configured to reconfigure excess DC power on the DC bus based on a plurality of priorities, a plurality of feedback signals and a plurality of system parameters.

Further exemplary embodiments include DC bus management method in a DC bus, the method including comparing a DC bus voltage against a plurality of voltage references, in response to an excess of the DC voltage compared to a first voltage reference of the plurality of voltage references, sending a first control signal instructing a first redirection of DC power in the DC bus, in response to an excess of the DC voltage compared to a second voltage reference of the plurality of voltage references, sending a second control signal instructing a second redirection of DC power in the DC bus and in response to an excess of the DC voltage compared to a third voltage reference of the plurality of voltage references, sending a third control signal instructing a third redirection of DC power in the DC bus.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Embodiments include systems and methods for enabling DC bus system reconfiguration to redirect DC power in a high voltage DC system. The systems and methods described herein harvest regenerative energy by redirecting DC power to the energy storage device or converting the DC power to mechanical energy if the DC power cannot be stored, and thus maintain good power quality on the DC bus without the addition of large DC filters, during load transients.

Figure 1:
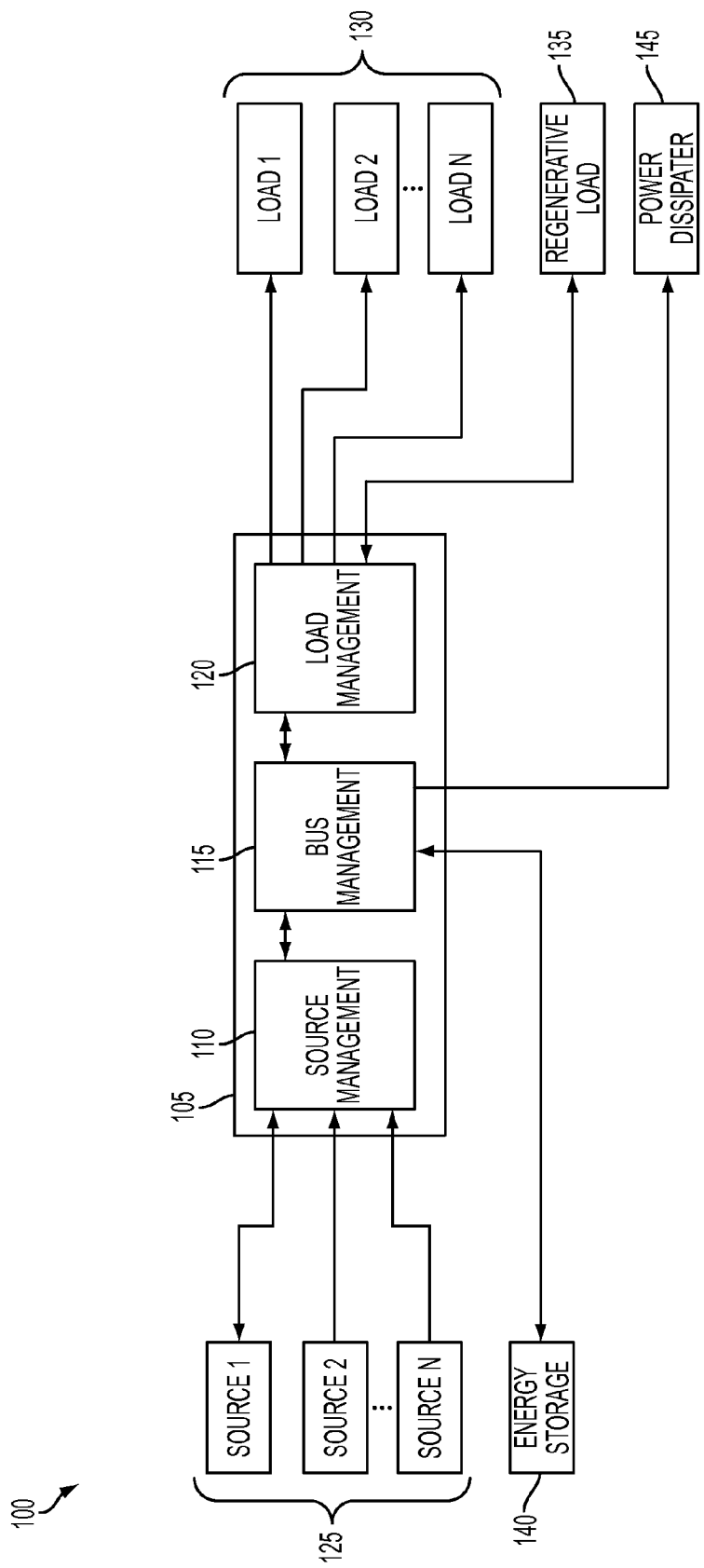
FIG. 1 illustrates a system diagram of a DC bus management system.

FIG. 1 illustrates a system diagram of a DC bus management system 100. The system 100 includes a power management and distribution (PMAD) unit 105, which includes a source management section 110 coupled to a bus management section 115, which is coupled to a load management section 120. FIG. 1 thus illustrates the interrelation between functions of each of the source management section 110, bus management section 115, and the load management section 120. The system 100 further includes multiple high voltage DC sources 125 (i.e., source 1, 2 ... N) coupled to the source management section 110, and multiple loads 130 coupled to the load management section 120. The system 100 further includes a regenerative load 135 from which regenerative energy can be recovered as further described herein. An energy storage unit 140 and a power dissipater 145 can further be coupled to the bus management section 115. In one embodiment, the energy storage unit 140 stores redirected DC energy, and the power dissipater 145 dissipates any unrecovered energy. The power dissipater 145 can be a power resistor. The power dissipater 145 can also include a temperature sensor to monitor the temperature.

The source management section 110, the bus management section 115 and the load management section 120 include various functions as described herein. In one embodiment, the source management section 110 provides source protective functions including but not limited to: over/under voltage; over-temperature; excessive voltage ripple; and differential protection. In one embodiment, the bus management section 115 provides autonomous reconfiguration and redirection of DC power based on priorities, feedback signals and system parameters for increased efficiency and performance of the system 100. In one embodiment, the load management section 120 provides load protective functions including but not limited to: over-current; thermal memory; over/under voltage; over-temperature; excessive current ripple; and arc fault detection. The load management section 120 further provides: load stabilization by actively damping load voltage oscillations; current limiting; soft start of capacitive loads; and nuisance trip avoidance.

As described above, the bus management section 115 provides autonomous reconfiguration and redirection of DC power for increased efficiency and performance of the system 100. In one embodiment, the bus management section 115 executes a DC bus management process for providing the autonomous reconfiguration and redirection based on priorities, feedback signals and system parameters. The DC bus management process is described further herein and the following description discusses several of the supporting functions.

Figure 2:
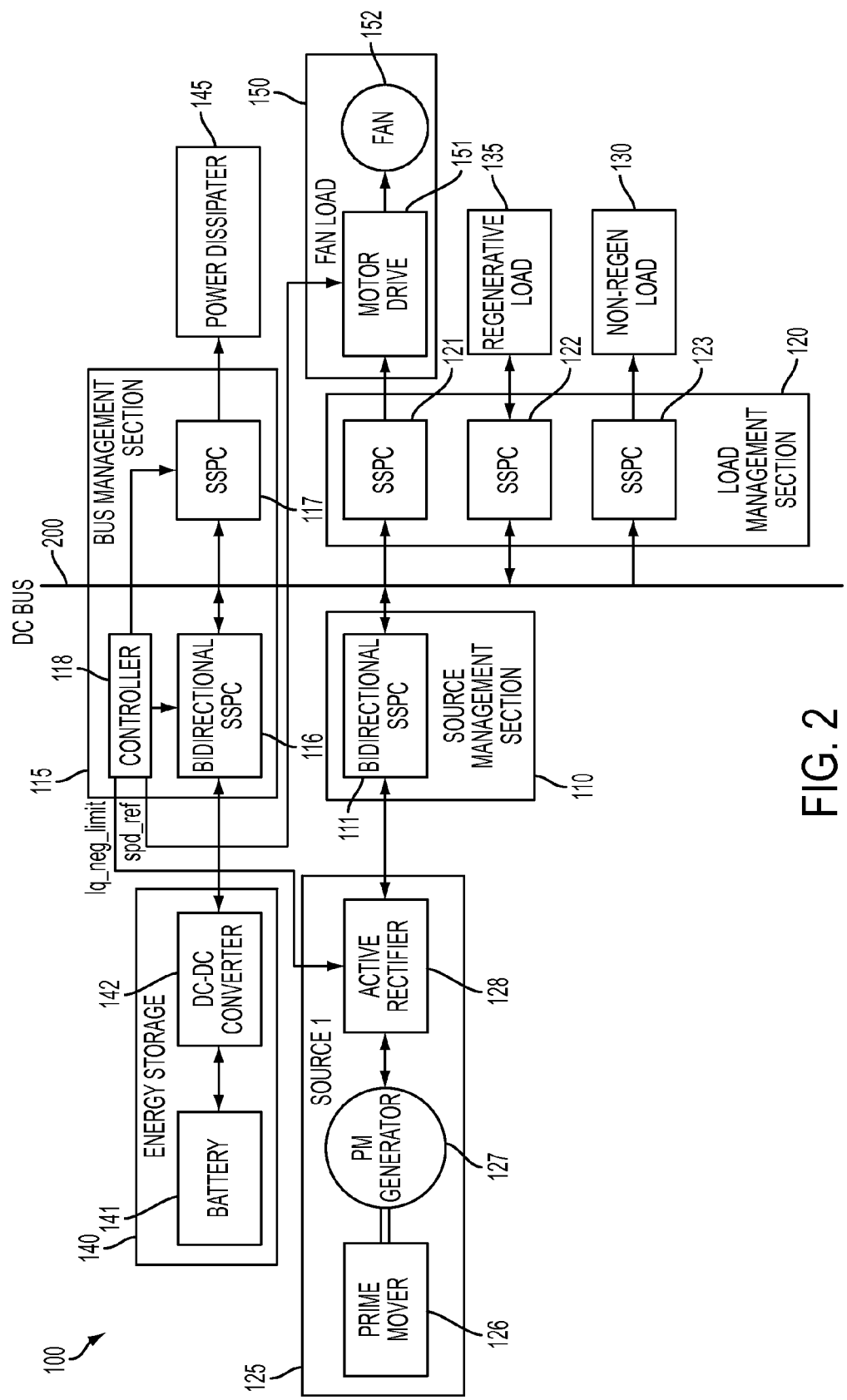
FIG. 2 illustrates a system diagram of the DC bus management system of FIG. 1 in further detail.

FIG. 2 illustrates a system diagram of the DC bus management system 100 of FIG. 1 in further detail. As described above, the system 100 includes the source management section 110, the bus management section 115 and the load management section 120. In one embodiment, one or all of the source management section 110, the bus management section 115 and the load management section 120 include at least one solid state power controller (SSPC), which are implemented in power distribution systems to replace traditional electromechanical circuit breakers. The functions of the SSPC can include power distribution and protection of power to different loads to name a few. In comparison to electromechanical devices, an SSPC provides fast response time, and eliminates arcing during turn-off transients and bouncing during turn-on transients. SSPCs typically do not suffer severe degradation during repeated fault isolation as compared with electromechanical devices. SSPCs facilitate advanced protection and diagnostics, and provide more efficient power distribution architectures and packaging techniques, due to the smaller size and weight than compared to conventional electromechanical switches. As such, the SSPCs allow the source management section 110, the bus management section 115 and the load management section 120 to perform the protective functions described herein. The SSPCs can be classified as unidirectional and bidirectional. Both type of SSPCs conduct current in both directions. A unidirectional SSPC can interrupt current only in one direction from source to load and this are implemented in load management. Bidirectional SSPC can interrupt current in both directions that enables source and bus management.

Referring still to FIG. 2, the source management section 110 includes a bidirectional SSPC 111 coupled to a DC bus 200. The SSPC 111 is further coupled to one or more DC sources 125, one of which is illustrated in FIG. 2. It can be appreciated that the source management section 110 can include an additional SSPC for each additional source. As an illustrative example, the DC source 125 includes a prime mover (e.g., an internal combustion engine) 126, a permanent magnet generator 127 that generates an AC voltage and an active rectifier 128 that converts the AC voltage to a DC voltage, and is coupled to the SSPC 111. The bus management section 115 is also coupled to the DC bus 200. In one embodiment, the bus management section 115 includes a first bidirectional SSPC 116 coupled to the DC bus 200. The first SSPC 116 is also coupled to the energy storage unit 140. As illustrated, the energy storage unit 140 further includes a battery 141 coupled to a DC-DC converter 142, which converts DC to different levels of DC. The bus management section 115 includes a second SSPC 117 that is coupled to the DC bus 200. The second SSPC 117 is also coupled to the power dissipater 145. In one embodiment, the bus management section 115 further includes a DC bus management controller 118. In one embodiment, the DC bus management controller 118 is coupled to the first and second SSPC 116, 117, to the DC sources 125 and to a fan load 150, which includes a motor drive 151 and fan 152. In one embodiment, the DC bus management controller 118 redirects the unused DC power to the fan load 150 for cooling purposes if the DC bus management controller 118 cannot redirect the DC power to one of the other reusable sources (e.g., the energy storage unit 140). As such, the system 100 can redirect DC power to the fan load 150 to cool the system 100. As further described herein, the DC bus management controller 118 sends and receives signals to instruct the system 100 how to redirect the DC power. As such, the DC bus management controller 118 coordinates bus connection and time duration to energy storage, energy dissipation (i.e., to the cooling fan), power dissipation to resistive loads, and DC sources.

The load management section 120 is also coupled to the DC bus 200. The load management section 120 includes a first SSPC 121 coupled to the DC bus 200 and to the fan load 150. The load management section 120 further includes a second SSPC 122 coupled to the DC bus 200 and to the regenerative load 135. The load management section 120 includes a third SSPC 123 coupled to the DC bus 200 and to the non-regenerative load 130. The first, second and third SSPCs 121, 122, 123 provide the protective functions to the fan load 150, the regenerative load 135 and the non-regenerative load 130 as described herein.

Figure 3:
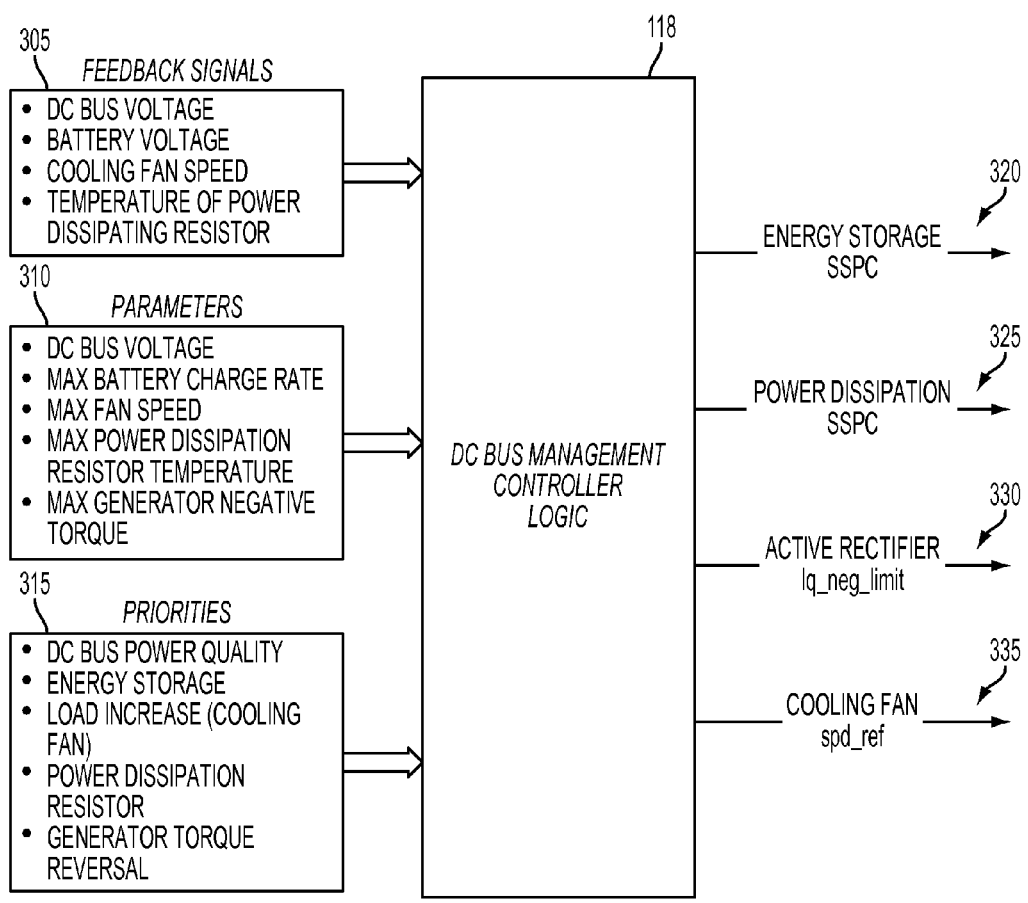
FIG. 3 illustrates the DC bus management controller of FIG. 2.

FIG. 3 illustrates the DC bus management controller 118 of FIG. 2. As described herein, the DC bus management controller 118 receives various feedback signals 305, parameters 310 and priorities 315 to determine how to redirect DC power. In one embodiment, the feedback signals 305 include but are not limited to: DC bus voltage; battery voltage; cooling fan speed; and temperature of a power dissipating resistor. The DC bus management controller 118 can monitor the battery charge to determine if the energy storage unit 140 is available to receive energy for storage. The DC bus management controller 118 can monitor the fan 152 speed to see if it is available to speed up in the event of extra DC power. The DC bus management controller 118 can monitor the temperature of the power dissipater 145 to see if it has a temperature suitable to receive extra DC power.

In one embodiment, the parameters 310 include but are not limited to: DC bus voltage; maximum battery charge rate; maximum fan speed; maximum power dissipation resistor temperature; and maximum generator negative torque. The maximum battery charge rate determines how fast the battery 141 can charge in the event DC energy is directed to the battery 141. The maximum fan speed determines the speed limit if DC power is diverted to it. The maximum power dissipation resistor temperature determines the upper limit of how high the temperature of the power dissipater 145 can be if DC power is redirected to it. The maximum generator negative torque determines how much reverse torque can be applied in one of the DC loads 125.

In one embodiment, the priorities 315 include, but are not limited to: DC bus power quality; energy storage; load increase (e.g., fan load 150); power dissipation resistor; and generator torque reversal. As such, priorities can be set to determine how extra DC power is redirected.

The DC bus management controller 118 can also generate various control signals in response to the received feedback signals 305, parameters 310 and priorities 315. In one embodiment, the DC bus management controller 118 can generate: an energy storage signal 320; a power dissipation signal 325; an active rectifier signal 330; and a cooling fan signal 335. In one embodiment, the energy storage signal 320 controls the first SSPC 116 in the bus management section 115 to enable energy storage in the energy storage unit 140. In one embodiment, the signal 325 controls the second SSPC 117 in the bus management section 115 to enable power dissipation in the power dissipater 145. In one embodiment, the third signal 330 is a negative current reference limit (i.e., Iq_neg_limit) that controls negative torque of the permanent magnet generator 127. In one embodiment, the fourth signal 335 (i.e., spd_ref) sets the speed of the cooling fan (e.g., the fan 152).

Figure 4:
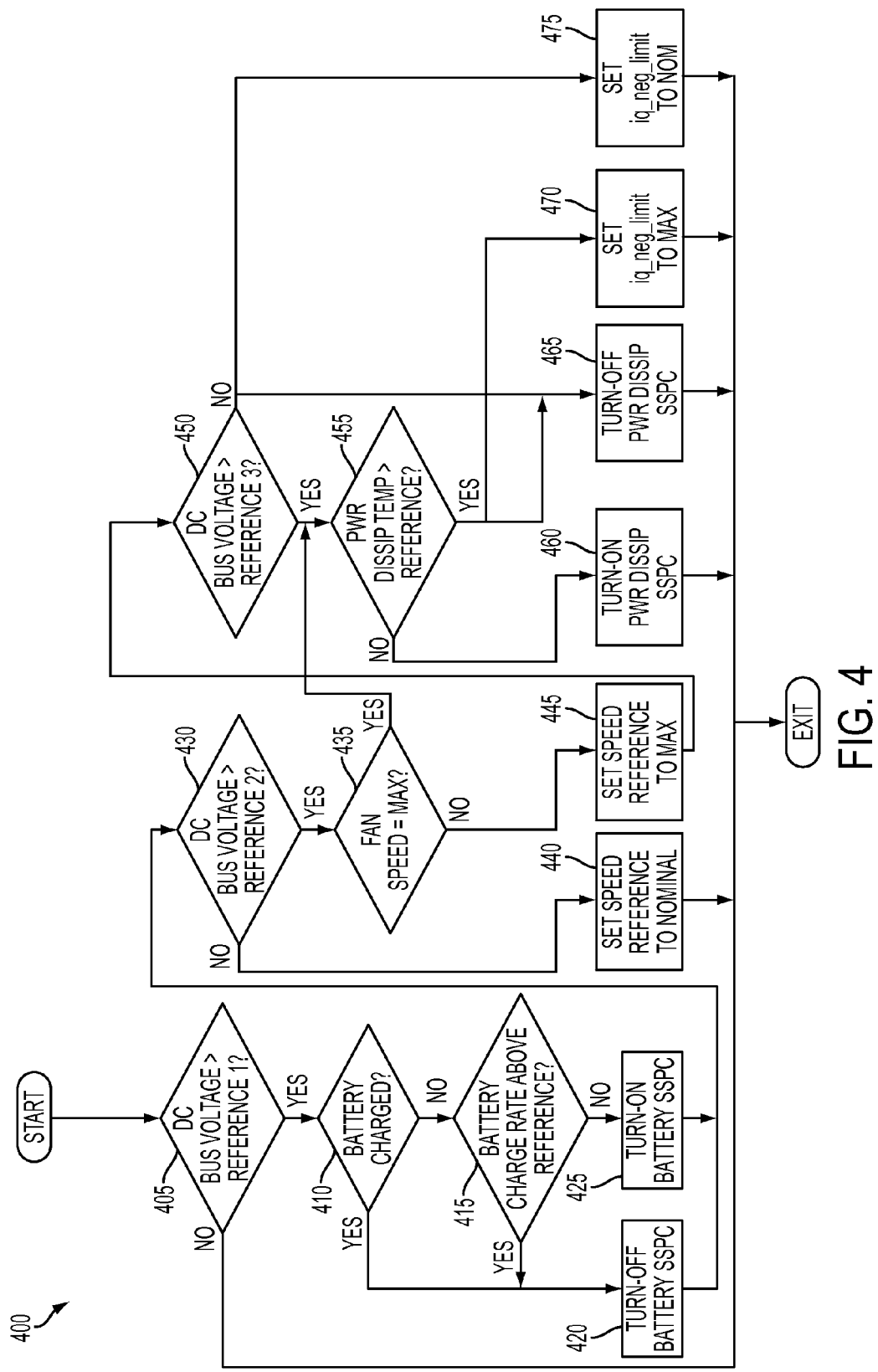
FIG. 4 is a flow chart that illustrates a DC management method in accordance with an embodiment.

The function and form of the signals 320, 325, 330, 335 are further discussed with respect to FIG. 4, which illustrates a flow chart of a method 400 of a DC management method (process) 400 in accordance with an embodiment. The method 400 also demonstrates how the DC bus management controller 118 receives several feedback signals 305 and compares them with various parameters 310. At block 405, the DC bus management controller 118 checks the DC bus voltage against a first DC reference. If the DC bus voltage is not greater than the first DC reference at block 405, then the method 400 ends. If the DC bus voltage is greater than the first DC reference at block 405, then the DC bus management controller 118 determines if the battery 141 is charged at block 410. If the battery 141 is not charged, then the DC bus management controller 118 determines if a battery charge rate is above a predetermined reference at block 415. If at block 415, the battery charge rate is not above the predetermined reference, then at block 425, the DC bus management controller 118 turns on the first SSPC 116, which sends the energy storage signal 320 to power on the energy storage unit 140. If the DC bus management controller 118 determines either that the battery 141 is charged at block 410 or that the battery charge rate is above the predetermined reference at block 415, then at block 420, the DC bus management controller 118 turns off the first SSPC 116, which sends the energy storage signal 320 to power off the energy storage unit 140

Referring still to FIG. 4, processing progresses from both blocks 420 and 425 to block 430 where the DC bus management controller 118 checks the DC bus voltage against a second DC reference. If the DC bus voltage is not greater than the second DC reference then the DC bus management controller 118 sets the speed reference signal 335 to a nominal speed at block 440, which directly controls the motor drive 151 and thus the fan 152, and the method 400 ends. If the DC bus voltage is greater than the second DC reference as determined at block 430, then the DC bus management controller 118 determines if the fan speed is equal to a maximum fan speed parameter at block 435. If the fan speed is not equal to a maximum fan speed parameter, then at block 445 the DC bus management controller 118 sets the speed reference signal 335 to maximum, and then at block 450, the DC bus management controller 118 checks the DC bus voltage against a third DC reference at block 450. If the DC bus voltage is not greater than the third DC reference at block 450, then the DC bus management controller 118 sets the active rectifier signal 330 to nominal at block 475, which maintains any negative torque to the permanent magnet generator 127. In addition, the DC bus management controller 118 turns off the second SSPC 117 at block 465, which sends the power dissipation signal 325 to power off the power dissipater 145, and the method 400 ends. If the DC bus voltage is greater than the third DC reference at block 450, or if the fan speed is not equal to a maximum fan speed parameter at block 435, then the DC bus management controller 118 determines if the power dissipater 145 temperature is greater than a predetermined reference at block 455. If the power dissipater 145 temperature is not greater than a predetermined reference at block 455, then at block 460 the DC bus management controller 118 turns on the second SSPC 117 at block 460, which sends the power dissipation signal 325 to power on the power dissipater 145, and the method 400 ends. If the power dissipater 145 temperature is determined to be greater than a predetermined reference at block 455, then the DC bus management controller 118 turns off the second SSPC 117 at block 465, which sends the power dissipation signal 325 to power off the power dissipater 145. In addition, the DC bus management controller 118 sets the active rectifier signal 330 to maximum at block 470, which increases negative torque to the permanent magnet generator 127 to enable reversal of power flow and reduce dc bus overvoltage condition, and the method 400 ends.

FIG. 4 illustrates an example of priorities set in the DC bus management controller 118. In addition, the three reference voltages are increasingly larger. As such, if the first reference is exceeded, then the DC bus management controller 118 redirects the extra DC energy to charge the battery. If the second reference is exceeded, the DC bus management controller 118 attempts to increase cooling to the system 100. If the fan 152 is already at its maximum speed, and/or of the third reference voltage is exceeded, then the DC bus management controller 118 attempts to decrease the input DC load and if necessary dissipates the extra DC energy. It can be appreciated that the order in which these priorities are set can change in other embodiments.

The DC bus management controller 118 can be any suitable microcontroller or microprocessor for executing the instructions (e.g., on/off commands) described herein. As such, the suitable microcontroller or microprocessor can be any custom made or commercially available processor, a central processing unit (CPU), an auxiliary processor among several processors, a semiconductor based microprocessor (in the form of a microchip or chip set), a microprocessor, or generally any device for executing software instructions.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include the capturing of regenerative energy and improvement of power quality on DC buses.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A direct current (DC) bus management system, comprising:
    a power management and distribution (PMAD) unit, including:
        a source management section;
        a bus management section coupled to the source management section; and
        a load management section coupled to the bus management section;
    a DC bus coupled to the PMAD unit;
    a plurality of DC sources coupled to the source management section; and
    a plurality of loads coupled to the load management section,
    wherein the bus management section in operation reconfigures excess DC power on the DC bus from the plurality of DC sources based on a plurality of priorities, a plurality of feedback signals and a plurality of system parameters.

2. The system as claimed in claim 1 further comprising an energy storage unit coupled to the bus management section.

3. The system as claimed in claim 2 wherein the bus management section redirects some or all of the excess DC power to be stored in the energy storage unit.

4. The system as claimed in claim 2 further comprising a fan load coupled to the load management section and the bus management section.

5. The system as claimed in claim 4 wherein the bus management section redirects some or all of the excess DC power to drive the fan load.

6. The system as claimed in claim 4 further comprising a power dissipater coupled to the bus management section.

7. The system as claimed in claim 6 wherein the bus management section redirects some or all of the excess DC power to be dissipated in the power dissipater.

8. The system as claimed in claim 6 wherein the bus management section includes a DC bus management controller in signal communication with the energy storage unit, the fan load and the power dissipater.

9. The system as claimed in claim 8 wherein the DC bus management controller includes a process configured to:
    compare a DC bus voltage against a plurality of voltage references;
    in response to an excess of the DC voltage compared to a first voltage reference of the plurality of voltage references, send a first control signal instructing redirection of the DC power to the energy storage unit;
    in response to an excess of the DC voltage compared to a second voltage reference of the plurality of voltage references, send a second control signal instructing redirection of the DC power to drive the fan load;
    in response to an excess of the DC voltage compared to a third voltage reference of the plurality of voltage references, send a third control signal instructing a decrease generation of a source of DC power to the DC bus; and
    in response to an excess of the DC voltage compared to a third voltage reference of the plurality of voltage references, send a fourth control signal instructing a redirection of the DC power to a power dissipater.

10. A power management and distribution (PMAD) apparatus, comprising:
    a source management section;
    a bus management section coupled to the source management section;
    a load management section coupled to the bus management section; and
    a DC bus coupled to the a source management section, the bus management section, and the load management section,
    wherein the bus management section in operation reconfigures excess DC power on the DC bus based on a plurality of priorities, a plurality of feedback signals and a plurality of system parameters.

11. The apparatus as claimed in claim 10 wherein the bus management section is configured to be coupled to an energy storage unit, and to redirect the excess DC power to be stored in the energy storage unit.

12. The system as claimed in claim 10 wherein the bus management section is configured to be coupled to a fan load and to redirect the excess DC power to drive the fan load.

13. The system as claimed in claim 10 wherein the bus management section is configured to be coupled to a power dissipater and to redirect the excess DC power to be dissipated in the power dissipater.

14. The system as claimed in claim 10 further comprising a DC bus management controller disposed in the bus management section.

15. The system as claimed in claim 14 wherein the DC bus management controller includes a process configured to:
    compare a DC bus voltage against a plurality of voltage references;
    in response to an excess of the DC voltage compared to a first voltage reference of the plurality of voltage references, send a first control signal instructing a first redirection of DC power in the DC bus;
    in response to an excess of the DC voltage compared to a second voltage reference of the plurality of voltage references, send a second control signal instructing a second redirection of DC power in the DC bus; and
    in response to an excess of the DC voltage compared to a third voltage reference of the plurality of voltage references, send a third control signal instructing a third redirection of DC power in the DC bus.

16. A direct current (DC) bus management method in a DC bus, the method comprising:
    comparing a DC bus voltage against a plurality of voltage references;
    in response to an excess of the DC voltage compared to a first voltage reference of the plurality of voltage references, sending a first control signal instructing a first redirection of DC power in the DC bus;
    in response to an excess of the DC voltage compared to a second voltage reference of the plurality of voltage references, sending a second control signal instructing a second redirection of DC power in the DC bus; and
    in response to an excess of the DC voltage compared to a third voltage reference of the plurality of voltage references, sending a third control signal instructing a third redirection of DC power in the DC bus.

17. The method as claimed in claim 16 wherein the first control signal instructs redirection of the DC power to an energy storage unit.

18. The method as claimed in claim 16 wherein the second control signal instructs redirection of the DC power to drive a cooling fan.

19. The method as claimed in claim 16 wherein the third control signal instructs a decrease of DC power generation from a source of DC power to the DC bus.

20. The method as claimed in claim 19 further comprising sending a fourth control signal instructing a redirection of the DC power to a power dissipater.

* * * * *